United States Patent
Petrishe

(10) Patent No.: US 6,918,606 B2
(45) Date of Patent: Jul. 19, 2005

(54) TRICYCLE PUSH HANDLE ARRANGEMENT

(75) Inventor: Charles Petrishe, Brookfield, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 10/638,951

(22) Filed: Aug. 11, 2003

(65) Prior Publication Data

US 2005/0035573 A1 Feb. 17, 2005

(51) Int. Cl.⁷ .................................................. B62H 7/00
(52) U.S. Cl. ..................................... 280/293; 280/288.4
(58) Field of Search ................................. 280/282, 292, 280/293, 288.4, 304.5; 403/187, 188, 192, 194, 197, 201

(56) References Cited

U.S. PATENT DOCUMENTS

| | | | |
|---|---|---|---|
| 2,242,427 A | * 5/1941 | Heanue | ............... 256/65.08 |
| 2,672,351 A | 3/1954 | Kane | |
| 2,816,775 A | 12/1957 | Costello | |
| 3,485,507 A | 12/1969 | Christof | |
| 4,927,117 A | * 5/1990 | Gainey | .................. 248/539 |
| 5,028,066 A | 7/1991 | Garth | |
| 5,154,096 A | 10/1992 | Geller et al. | |
| 5,217,240 A | 6/1993 | Gardenhour, Jr. et al. | |
| 5,303,944 A | * 4/1994 | Kalmus | ................. 280/288.4 |
| 5,558,348 A | 9/1996 | Becka | |
| 5,564,726 A | 10/1996 | Hearn et al. | |
| 5,577,750 A | 11/1996 | Sklar | |
| 5,581,868 A | * 12/1996 | Bisch | ..................... 29/525.08 |
| 5,915,711 A | 6/1999 | Seiple | |
| 5,988,663 A | 11/1999 | Starks | |
| 6,120,048 A | 9/2000 | Li | |
| 6,135,479 A | 10/2000 | Tibay et al. | |
| 6,149,178 A | 11/2000 | Bradbury et al. | |
| 6,398,248 B1 | 6/2002 | Dodson | |

* cited by examiner

Primary Examiner—Lesley D. Morris
Assistant Examiner—L. Lum
(74) Attorney, Agent, or Firm—DLA Piper Rudnick Gray Cary US LLP

(57) ABSTRACT

A push handle arrangement for a tricycle where the tricycle includes a front wheel, a pair of rear wheels and a frame member extending there between. A push handle cup passes through the frame member and defines a chamber that is sized to receive the lower portion of a push handle. The lower portion of the push handle is provided with a spring pin. The push handle cup includes an aperture that is sized and positioned to receive the spring pin of the push handle when the lower portion of the push handle is positioned within the push handle cup.

18 Claims, 5 Drawing Sheets

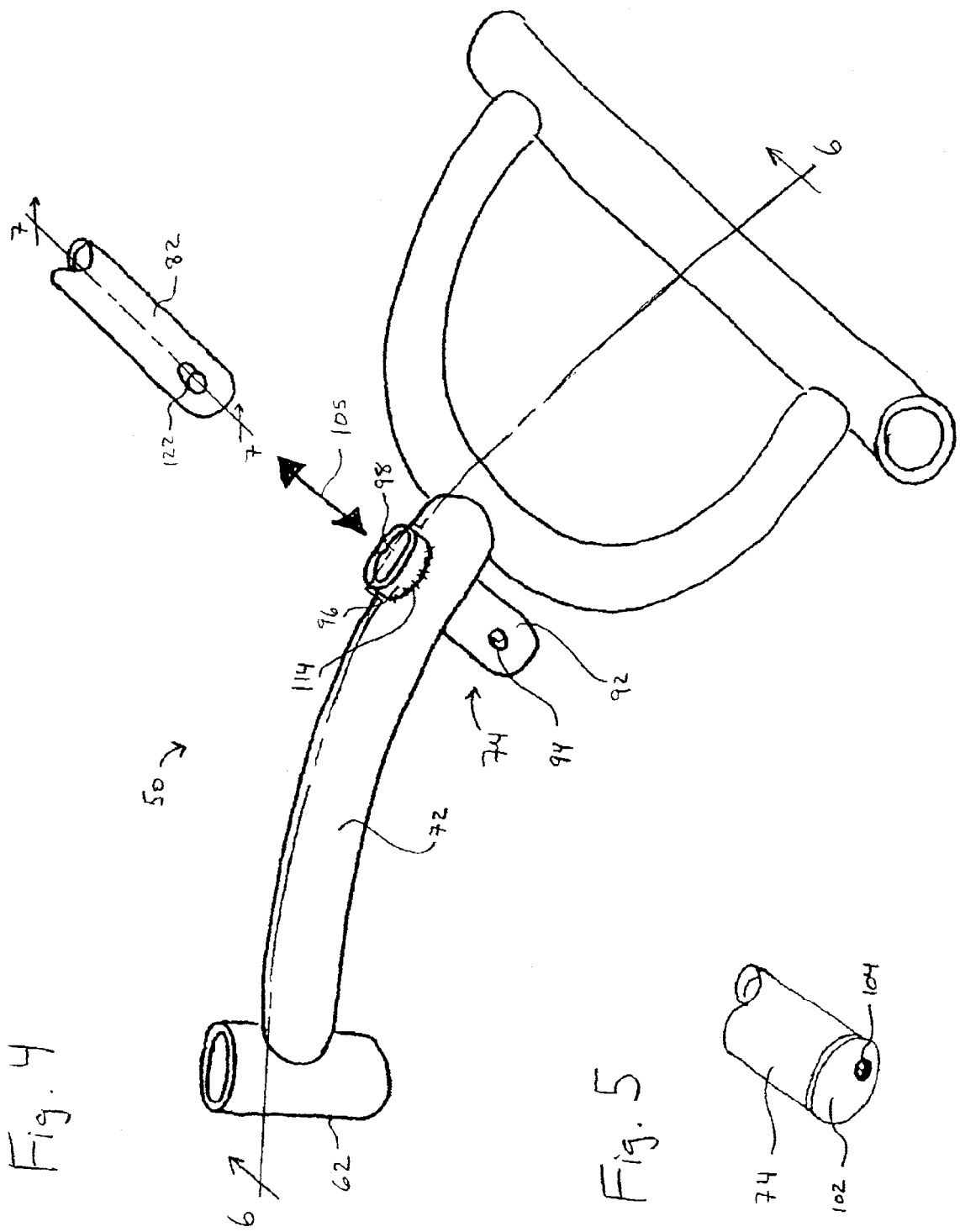

TRICYCLE PUSH HANDLE ARRANGEMENT

BACKGROUND OF THE INVENTION

This invention relates generally to tricycles, and, more particularly, to a removable push handle arrangement for children's tricycles and the like.

Handles for pushing children's tricycles are known in the art. Such devices are popular in that they facilitate training a child in the riding of a tricycle. More specifically, during the initial stages of learning, a parent often must push the tricycle as the child develops the ability to steer and pedal. A push handle allows the parent to push the tricycle without bending over. This reduces the risk that the parent will strain or injure his or her back. In addition, if the tricycle is equipped with locking handlebars and/or freewheeling pedals, such as in the case of the PUSH, PEDAL & GO tricycle sold by Radio Flyer Inc. of Chicago, Ill., the push handle enables the tricycle to be used as a stroller.

Examples of prior art push handle arrangements are presented in FIGS. 1 and 2. A prior art child's tricycle is indicated in general at 10 in FIG. 1. The tricycle features a tubular steel frame 12. A push handle bracket, indicated in general at 14, features a cylindrical portion 16 and a flange 18. The push handle bracket is secured by its flange 18 to the tricycle frame 12 via bolts 20a and 20b and nuts 22a and 22b. A spring pin 24 protrudes from the cylindrical portion 16 of the push handle bracket. A tubular push handle 26 is sized so as to fit over the cylindrical portion 16 of the push handle bracket and features an opening 28 that is sized to receive the spring pin 24 of the push handle bracket 14. As a result, the push handle 26 may be removably attached to the tricycle 10.

A tricycle with a similar push handle attachment arrangement is illustrated in FIG. 2. More specifically, the tricycle, indicated in general at 30, has a push handle bracket, indicated in general at 32, that is attached by its flange 34 and bolts and nuts 36a, 36b and 38a, 38b, respectively, to the tubular steel frame 40 of the tricycle. Like the tricycle of FIG. 1, the push handle bracket 32 has a cylindrical section 42 from which a spring pin 44 protrudes. The spring pin 44 is received by an opening 46 formed in a tubular push handle 48 so that the push handle is removably secured on the cylindrical portion 42 of push handle bracket 32.

While the push handle arrangements illustrated in FIGS. 1 and 2 perform well, their push handle brackets must be attached to the tricycles using nuts and bolts. This requires the use of tools and the nuts or bolts may be accidentally lost. In addition, the nuts and bolts may loosen as the push handles are used. Excessive force on the push handles could also cause the cylindrical portions of the push handle brackets to bend with respect to their flanges.

Other push handle attachment arrangements for tricycles are illustrated in U.S. Pat. No. 2,672,351 to Kane and U.S. Pat. No. 6,149,178 to Bradbury et al. In both of these patents, the push handles are attached to the tricycles by push handle brackets that wrap around the rear portions of the tricycle frames. In both instances, however, the push handle brackets clamp to the tricycle frames via nuts and bolts. As a result, the handle attachment arrangements suffer from many of the same disadvantages as the arrangements illustrated in FIGS. 1 and 2.

U.S. Pat. No. 5,028,066 to Garth shows a tricycle with a push handle that passes through an opening formed through the tricycle's tubular steel frame. A winged set screw also passes through the tricycle frame in a direction perpendicular to the longitudinal axis of the push handle and secures the push handle in place. A disadvantage of such an arrangement is that the winged set screw may work lose. In addition, the push handle is only supported by the sides of the opening that is formed through the frame.

Accordingly, it is an object of the present invention to provide a push handle arrangement where the push handle may be quickly and easily attached to and removed from a tricycle.

It is another object of the present invention to provide a push handle arrangement where the push handle may be securely attached to a tricycle.

It is another object of the present invention to provide a push handle arrangement that is durable.

It is another object of the present invention to provide a push handle arrangement that is economical to construct.

It is still another object of the present invention to provide a push handle arrangement that is easy to assemble for a consumer.

It is still another object of the present invention to provide a push handle arrangement where the push handle may be attached to a tricycle without screws, bolts, nuts or the like.

It is still another object of the present invention to provide a push handle arrangement where the push handle may be attached to a tricycle without the use of tools.

SUMMARY OF THE INVENTION

The present invention is a push handle arrangement for a tricycle or other children's riding toy. The tricycle includes a front wheel, a pair of rear wheels and a frame member extending there between. An opening is formed through the frame member and a push handle cup is secured within the frame member opening by welds. A push handle including an upper portion and a lower portion is provided. The push handle cup defines a chamber that is sized to removably receive the lower portion of the push handle.

The push handle cup includes a bottom portion that extends beneath a bottom surface of the frame member. The lower portion of the push handle features a spring pin and the bottom portion of the push handle cup includes an aperture that is sized and positioned to receive the spring pin when the lower portion of the push handle is inserted into the push handle cup chamber. As a result, the push handle may be easily attached to or removed from the tricycle. The push handle cup includes a bottom with a drain hole formed therein.

The following detailed description of embodiments of the invention, taken in conjunction with the appended claims and accompanying drawings, provide a more complete understanding of the nature and scope of the invention.

BRIEF DESCRIPTION OF THE DRAWINGS

FIG. 4 is an enlarged perspective view of the frame of the tricycle of FIG. 3 and the lower portion of the push handle of FIG. 3;

FIG. 5 is a bottom perspective view of the bottom portion of the push handle cup of FIGS. 3 and 4;

DESCRIPTION OF THE PREFERRED EMBODIMENTS

Figure 3:
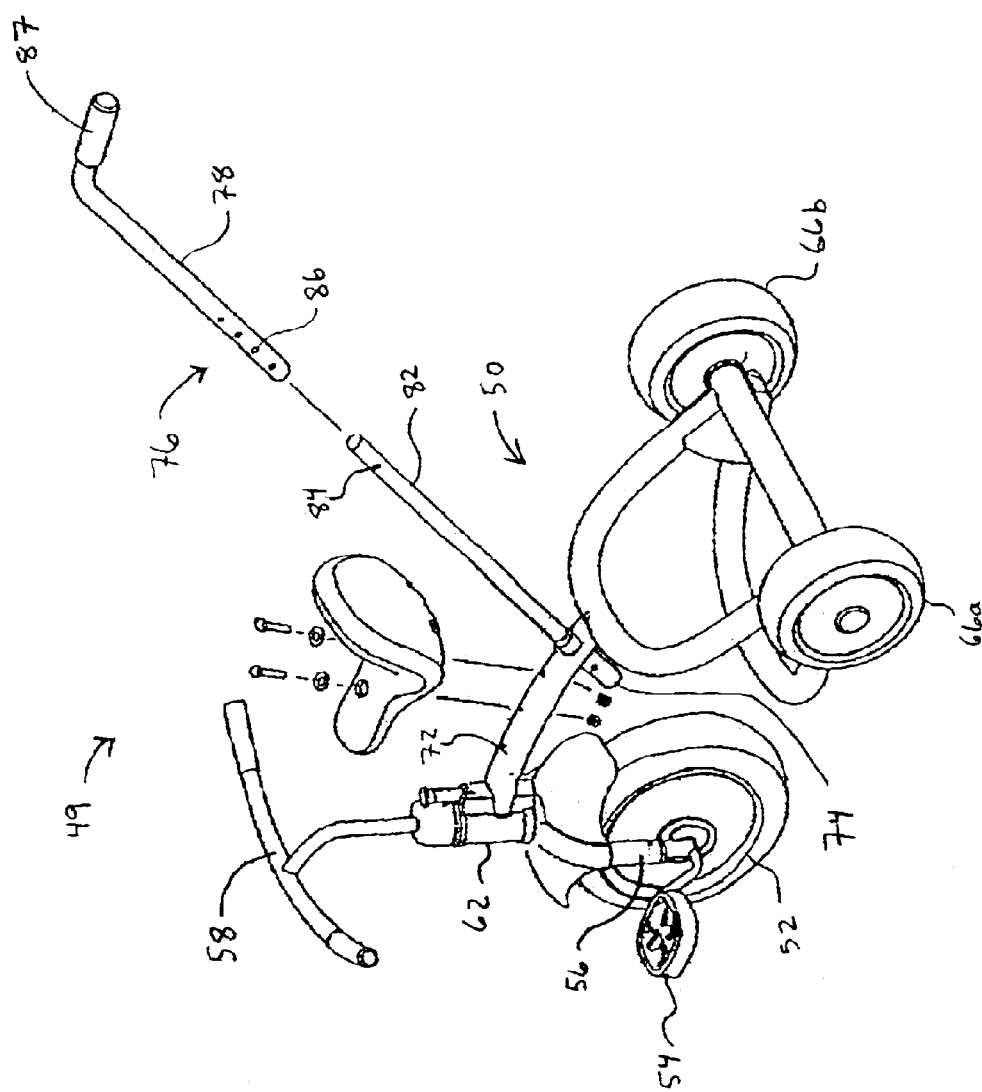
FIG. 3 is a rear perspective, partially exploded view of a tricycle equipped with an embodiment of the tricycle push handle arrangement of the present invention.

An tricycle equipped with an embodiment of the push handle arrangement of the present invention is indicated in general at 49 in FIG. 3. The tricycle features a frame, indicated in general at 50. As is known in the art, the tricycle features a front wheel 52 having pedals 54 affixed thereto. The front wheel and pedals are rotatably mounted between a pair of front forks 56. The front forks are connected to handlebars 58 so that the entire assembly pivots within the head tube 62 of the tricycle frame. This permits the tricycle to be steered. A pair of rear wheels 66a and 66b are rotatably mounted on the rear portion of the tricycle frame.

As illustrated in FIG. 3, the tricycle frame includes a main frame member or bar 72. As will be explained in greater detail below, the main frame bar 72 has been equipped with a push handle cup 74 having portions that extend above and below it. The push handle cup is sized to removably receive a push handle indicated in general at 76.

The push handle 76 features an upper portion and a lower portion, indicated at 78 and 82, respectively, in FIG. 3. The lower portion 82 of the push handle is equipped with an upper spring pin 84 while the upper portion 78 of the push handle features openings 86. A handle grip 87 is provided at the opposite end of the upper portion of the push handle. The upper portion 78 of the push handle 76 is also sized to receive the lower portion 82 in a sliding fashion. As a result, the length, and therefore height, of the push handle 76 may be adjusted. The spring pin 84 engages the appropriate opening 86 when the desired push handle length has been selected.

Figure 6:
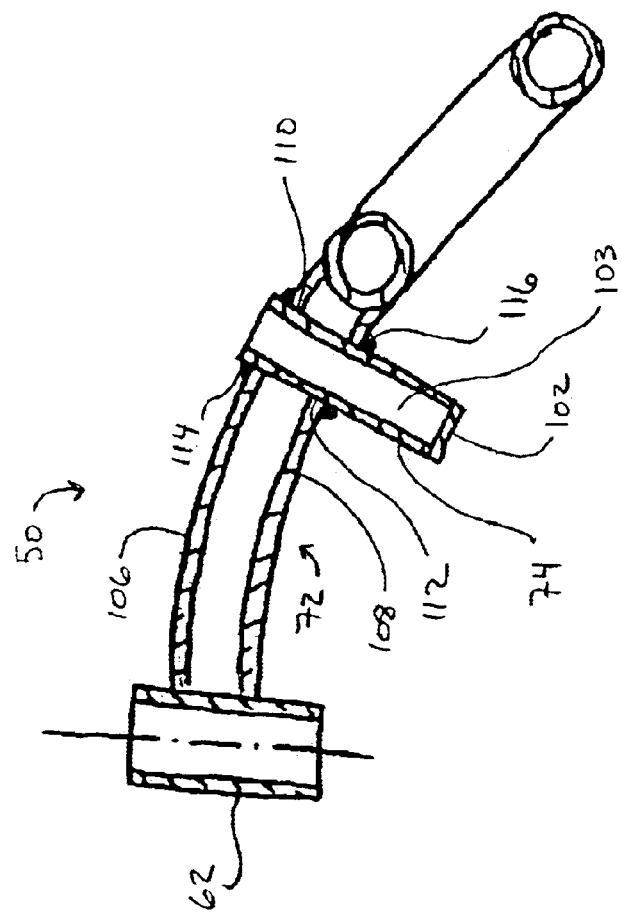
FIG. 6 is a cross sectional view of the frame of FIG. 5 taken along line 6—6.

As illustrated in FIG. 4, the push handle cup, illustrated in general at 74, includes a bottom portion 92 featuring an aperture 94 as well as a top portion 96 that includes an open top 98. As illustrated in FIGS. 5 and 6, the push handle cup 74 also includes a bottom 102 so that a chamber 103 (FIG. 6) is defined. As illustrated in FIG. 5, the push handle cup bottom 102 is provided with a drain hole 104. The drain hole 104 allows water collected in the push handle cup chamber 103 (FIG. 6) to drain when the tricycle is used without the push handle attached thereto. The cup chamber 103 is sized to receive the lower portion 82 of the push handle. As a result, as indicated by arrow 105 in FIG. 4, the lower portion 82 of the push handle may be inserted into or removed from the push handle cup.

The tricycle frame 50 is preferably constructed from steel tubing. The main frame bar, indicated in general at 72 in FIG. 6, features a top surface 106 and a bottom surface 108. Openings 110 and 112 are cut or otherwise formed in the top and bottom surfaces, respectively, of the main frame bar. As illustrated in FIGS. 4 and 6, the push handle cup 74 is positioned through the openings of the main frame bar and secured in place by circumferential welds 114 and 116. This provides a very secure attachment of the push handle cup to the tricycle frame. Alternatively, the push handle cup may be integrally molded with the main frame bar or an adhesive or other attachment method known in the art may be substituted for the circumferential welds.

Figure 7:
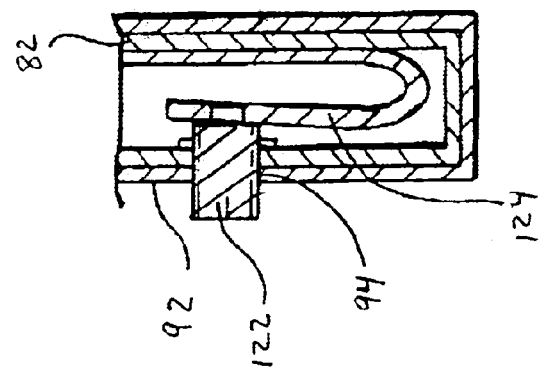
FIG. 7 is a cross sectional view of the lower portion of the push handle and push handle cup of FIG. 4 taken along lines 7—7 and 6—6, respectively.

As illustrated in FIGS. 4 and 7, the lower portion 82 of the push handle (indicated in general at 76 in FIG. 3) is equipped with a spring pin 122. The spring pin 122 extends radially from the lower portion of the push handle and is sized to engage the aperture 94 of the bottom portion 92 of the push handle cup, as illustrated in FIG. 7 (and FIG. 3) when the push handle is attached to the tricycle.

As illustrated in FIG. 7, the rear portion of the spring pin 122 abuts a leaf spring 124 that is positioned within the push handle lower portion 82. The spring 124 forces the pin 122 into engagement with push handle cup aperture 94. Spring 124 is preferably U-shaped and made of spring steel. Other pin and spring arrangements known in the art may be used as an alternative to the one illustrated in FIG. 7. When one wishes to remove the push handle from the tricycle, the pin 122 is easily moved against the force of the spring 124 such that it is moved out of the push handle cup aperture 94. At that time, the push handle may be easily removed from the push handle cup, and thus the tricycle itself.

Figure 1:
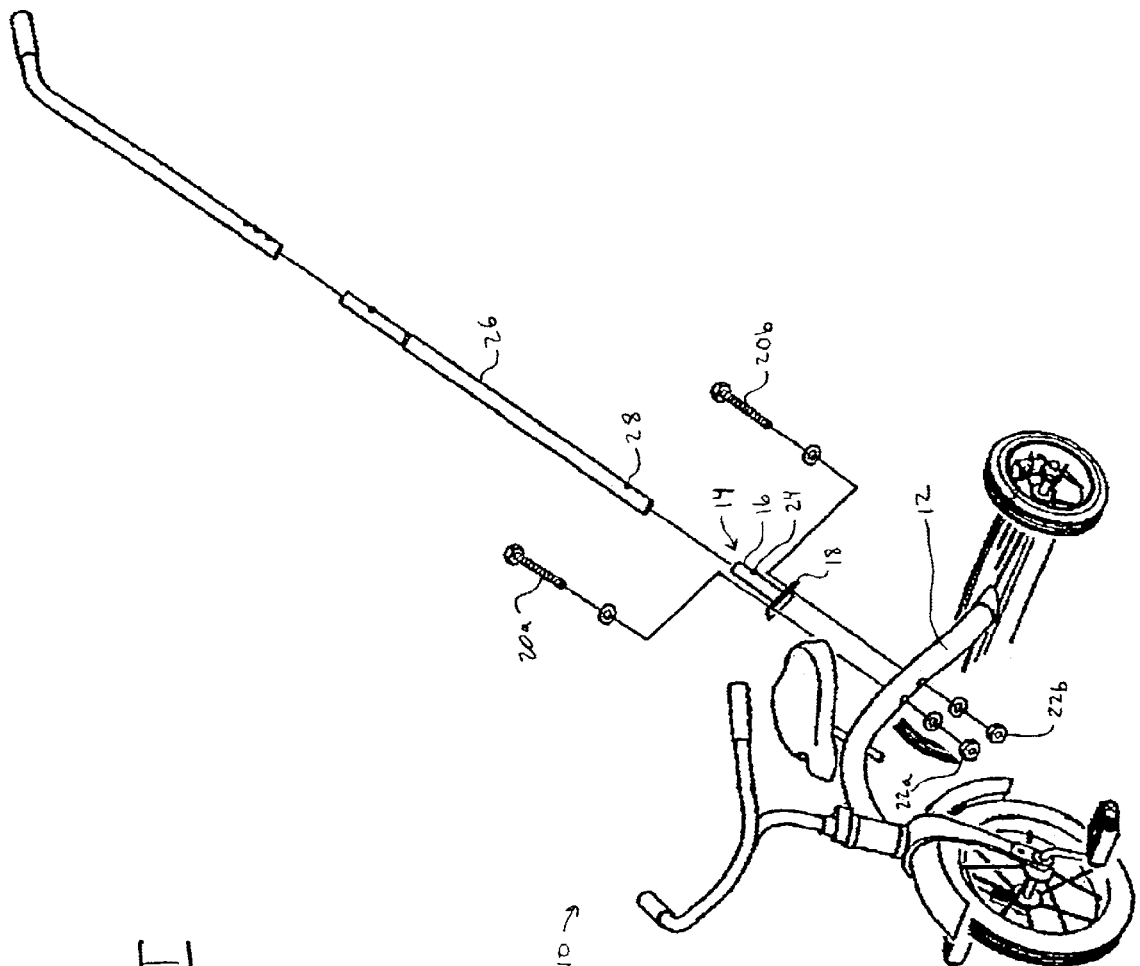
FIG. 1 is a front perspective, partially exploded view of a prior art tricycle with a push handle.
Figure 2:
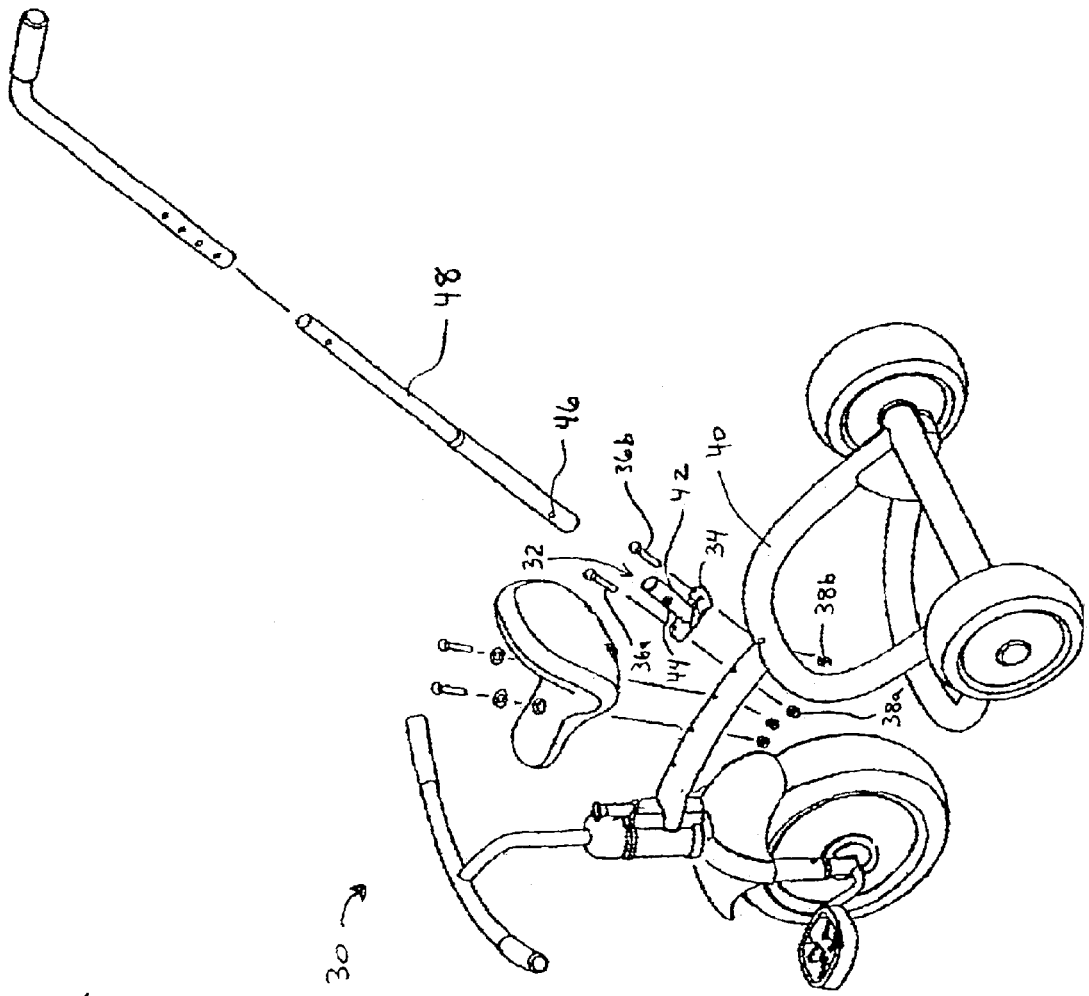
FIG. 2 is a rear perspective, partially exploded view of a second prior art tricycle with a push handle.

The present invention offers a push handle arrangement that is inexpensive to construct and that provides for a very durable, secure and stable attachment of a push handle to a tricycle or the like. The present invention also offers a push handle arrangement that facilitates assembly of the tricycle by consumers. The push handle arrangement of the present invention may be used with a wide variety of alternative tricycle designs and types, including, but not limited to the tricycle illustrated in FIG. 1. In addition, the push handle arrangement may also be used with a variety of other children's riding toys and vehicles such as ride-ons, pedal cars and bicycles.

While the preferred embodiments of the invention have been shown and described, it will be apparent to those skilled in the art that changes and modifications may be made therein without departing from the spirit of the invention, the scope of which is defined by the appended claims.

What is claimed is:

1. A children's riding toy comprising:
   a) a frame having at least one frame member;
   b) a plurality of wheels attached to said frame;
   c) a push handle including an upper portion and a lower portion;
   d) a push handle cup having a top portion and a bottom portion, said push handle cup passing through the frame member so that the bottom portion extends below a bottom surface of the frame member; and
   e) said push handle cup defining a chamber that is sized to removably receive the lower portion of the push handle so that said push handle may be removably attached to the children's riding toy.

2. The children's riding toy of claim 1 wherein the push handle cup includes an open top formed in its top portion where the lower portion of said push handle is inserted into the chamber of the push handle cup through the open top.

3. The children's riding toy of claim 1 wherein the top portion of the push handle cup extends above a top surface of the frame member.

4. The children's riding toy of claim 1 wherein the lower portion of the push handle features a spring pin and the bottom portion of the push handle cup includes an aperture that is sized and positioned to receive the spring pin when the lower portion of the push handle is inserted into the chamber of the push handle cup.

5. The children's riding toy of claim 4 wherein the spring pin includes a pin and a leaf spring positioned within the lower portion of the push handle, said leaf spring abutting the pin so that the pin is urged to extend outwards from the lower portion of the push handle.

6. The children's riding toy of claim 1 wherein the push handle cup is secured to the frame member by welds.

7. The children's riding toy of claim 1 wherein the frame member is steel tubing.

8. The children's riding toy of claim 1 wherein the push handle cup includes a bottom.

9. The children's riding toy of claim 8 where the plush handle cup bottom includes a drain hole.

10. The children's riding toy of claim 1 where in the upper and lower portions of the push handle slide relative to one another so that a push handle length may be selected and further comprising means for locking the upper and lower portions in the selected push handle length.

11. A children's riding toy comprising:
 a) a front wheel, a pair of rear wheels and a frame member constructed from steel tubing extending there between;
 b) a push handle including an upper portion and a lower portion;
 c) openings formed through a top surface and a bottom surface of the frame members; and
 d) a push handle cup secured within the frame member openings and defining a chamber sized to removably receive the lower portion of the push handle.

12. A tricycle comprising:
 a) a front wheel, a pair of rear wheels and a frame member extending there between;
 b) a push handle including an upper portion and a lower portion;
 c) an opening formed through the frame member;
 d) a push handle cup secured within the frame member opening and defining a chamber sized to removably receive the lower portion of the push handle and wherein a bottom portion of the push handle cup extends below a bottom surface of the frame member.

13. The children's riding toy of claim 11 wherein the lower portion of the push handle features a spring pin and the push handle cup includes an aperture that is sized and positioned to receive the spring pin when the lower portion of the push handle is inserted into the chamber of the push handle cup.

14. The children's riding toy of claim 13 wherein the spring pin includes a pin and a leaf spring positioned within the lower portion of the push handle, said leaf spring abutting the pin so that the pin is urged to extend outwards from the lower portion of the push handle.

15. The children's riding toy of claim 11 wherein the push handle cup is secured within the frame member opening by welds.

16. The children's riding toy of claim 11 wherein the push handle cup includes a bottom.

17. The children's riding toy of claim 16 wherein the bottom of the push handle cup has a drain hole formed therein.

18. The children's riding toy of claim 11 where in the upper and lower portions of the push handle slide relative to one another so that a push handle length may be selected and further comprising means for locking the upper and lower portions in the selected push handle length.

* * * * *